United States Patent
Xiao

(10) Patent No.: US 10,580,394 B2
(45) Date of Patent: *Mar. 3, 2020

(54) METHOD, CLIENT AND COMPUTER STORAGE MEDIUM FOR PROCESSING INFORMATION

(71) Applicant: TENCENT TECHNOLOGY (SHENZHEN) COMPANY LIMITED, Shenzhen, Guangdong (CN)

(72) Inventor: Fen Xiao, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 80 days.

This patent is subject to a terminal disclaimer.

(21) Appl. No.: 15/824,495

(22) Filed: Nov. 28, 2017

(65) Prior Publication Data

US 2018/0151163 A1    May 31, 2018

Related U.S. Application Data

(63) Continuation of application No. 15/187,056, filed on Jun. 20, 2016, now Pat. No. 9,858,910, which is a (Continued)

(30) Foreign Application Priority Data

Jan. 12, 2015    (CN) .......................... 2015 1 0014200

(51) Int. Cl.
*A63H 5/00* (2006.01)
*G10H 1/36* (2006.01)
(Continued)

(52) U.S. Cl.
CPC ........... *G10H 1/365* (2013.01); *G11B 27/031* (2013.01); *G11B 27/10* (2013.01);
(Continued)

(58) Field of Classification Search
CPC ............. G10H 1/365; G10H 2210/061; G10H 2210/091; G10H 2220/011; G10H 2220/106; G11B 27/10
(Continued)

(56) References Cited

U.S. PATENT DOCUMENTS

| 7,840,721 B2 | 11/2010 | Chiang et al. |
| 2002/0189429 A1* | 12/2002 | Qian .................... G10H 1/0041 84/610 |

(Continued)

FOREIGN PATENT DOCUMENTS

| CN | 1878217 A | 12/2006 |
| CN | 101131693 A | 2/2008 |

(Continued)

OTHER PUBLICATIONS

Office Action issued in Chinese Application No. 201510014200.7, dated Sep. 30, 2018.
(Continued)

*Primary Examiner* — Jianchun Qian
(74) *Attorney, Agent, or Firm* — BakerHostetler

(57) ABSTRACT

The present disclosure discloses a method, a client and a computer storage medium for processing information, wherein the method includes: triggering a first operation; downloading a first audio file and a first text file matching the first audio file in response to the first operation; partly truncating the first audio file to obtain a first audio clip according to first indication information for identifying a truncating start position and second indication information for identifying a truncating end position; triggering a second operation; playing the first audio clip and dynamically displaying a text information part in the first text file corresponding to the first audio clip synchronously in response to the second operation; acquiring voice informa-
(Continued)

tion of a user while playing the first audio chip; and synthesizing the first audio clip and the voice information into a first acquisition result.

20 Claims, 11 Drawing Sheets

Related U.S. Application Data continuation of application No. PCT/CN2016/070683, filed on Jan. 12, 2016.

(51) Int. Cl.
  *G11B 27/031* (2006.01)
  *G11B 27/10* (2006.01)
(52) U.S. Cl.
  CPC . *G10H 2210/061* (2013.01); *G10H 2210/091* (2013.01); *G10H 2220/011* (2013.01); *G10H 2220/106* (2013.01)
(58) Field of Classification Search
  USPC .......................................................... 84/609
  See application file for complete search history.

(56) References Cited

U.S. PATENT DOCUMENTS

| | | | | |
|---|---|---|---|---|
| 2006/0077767 A1* | 4/2006 | Young | .................. | G11B 19/025 369/30.01 |
| 2006/0277217 A1 | 12/2006 | Lehikoinen | | |
| 2009/0031883 A1* | 2/2009 | Bennetts | .............. | G10H 1/0058 84/609 |
| 2011/0246186 A1* | 10/2011 | Takeda | ................. | G10H 1/0008 704/201 |
| 2011/0257772 A1* | 10/2011 | Kerber | ................... | H04H 20/38 700/94 |
| 2014/0080428 A1 | 3/2014 | Rhoads et al. | | |
| 2014/0081797 A1* | 3/2014 | Rivera | ................. | G11B 27/002 705/26.5 |
| 2014/0149861 A1 | 5/2014 | Shih et al. | | |
| 2014/0336803 A1* | 11/2014 | Haverstock | .......... | G06Q 10/109 700/94 |
| 2017/0080428 A1 | 3/2017 | Shenderov et al. | | |

FOREIGN PATENT DOCUMENTS

| | | |
|---|---|---|
| CN | 101207871 A | 6/2008 |
| CN | 102377914 A | 3/2012 |
| CN | 103345931 A | 10/2013 |
| CN | 103400593 A | 11/2013 |
| CN | 103839565 A | 6/2014 |
| CN | 104966527 A | 10/2015 |
| CN | 105006234 A | 10/2015 |
| JP | 2012159575 A | 8/2012 |

OTHER PUBLICATIONS

Wang YK, "Intercepting method for National karaoke" at www.5577.com, dated Oct. 13, 2014.

International Search Report in international application No. PCT/CN2016/070683, dated Mar. 24, 2016.

English Translation of The Written Opinion of the International Search Authority in international application No. PCT/CN2016/070683, dated Mar. 24, 2016.

3533 mobile phone world, "How to Intercept the Fragments of Recoding Songs of Mass Karaoke?", http://www.3533.com/news/I5/201409/105524/, Sep. 15, 2014 (Sep. 15, 2014), pp. 1-2,mailed on Sep. 15, 2014.

* cited by examiner

METHOD, CLIENT AND COMPUTER STORAGE MEDIUM FOR PROCESSING INFORMATION

CROSS REFERENCE TO RELATED APPLICATIONS

This application is a continuation of U.S. application Ser. No. 15/187,056, filed on Jun. 20, 2016, now U.S. Pat. No. 9,858,910, issued on Jan. 2, 2018, which is a continuation application of International Patent Application No. PCT/CN2016/070683, filed on Jan. 12, 2016, which claims priority to Chinese Patent Application No. 2015100142007 filed on Jan. 12, 2015 the disclosures of which are incorporated by reference herein in their entirety.

TECHNICAL FIELD

The present disclosure relates to communication technology, and in particular to a method, a client and a computer storage medium for processing information.

BACKGROUND

In recent years, with the intelligence of intelligent terminals and the rapid development of network technologies, there are more and more information processing technologies of downloading information from a server and applying the information to various Applications (APP), and these information processing technologies can satisfy the needs in user's daily life and work.

An information processing application scenario can be a scenario for a common Karaoke APP on the intelligent terminal; such an APP installed on the intelligent terminal can play for the user an audio file, like a piece of accompaniment music corresponding to a song, which is downloaded from the server, acquire voice information of user and recognize it, and upload a recognition result or a comparison result which is obtained by further comparing the recognition result with preset standard reference information to the server for others to listen and comment.

Such an APP can only play all the downloaded audio files while acquiring the voice information of user, for example, the user sings and records a whole song, so there are following two problems:

1. using the traditional art cannot truncate a part of content of the audio file to play, so the larger the amount of acquired information is, the more complex the corresponding recognition effect is, and the longer the time spent on recognition is;

2. based on his/her own preference and voice, the user sings with a high pitch or a low pitch, which causes that the recognition result does not match the preset standard reference information, so the best vocal performance result cannot be obtained; that is, the user may be interested only in a part of content of the audio file, then it is only needed to truncate a part of content of the audio file, but using the traditional art cannot truncate a part of content of the audio file to play.

SUMMARY

In view of this, the present disclosure is intended to provide an information processing method, a client and a computer storage medium, for at least solving the problems in the traditional art.

The technical solutions of the present disclosure are implemented as follows.

An information processing method is provided, including:
a first operation is triggered;
in response to the first operation, a first audio file and a first text file matching the first audio file are downloaded;
the first audio file is partly truncated to obtain a first audio clip according to first indication information for identifying a truncating start position and second indication information for identifying a truncating end position;
a second operation is triggered;
in response to the second operation, the first audio clip is played, and a text information part in the first text file corresponding to the first audio clip is dynamically displayed synchronously;
voice information of a user is acquired while playing the first audio chip; and
the first audio clip and the voice information are synthesized into a first acquisition result.

A client is also provided, including:
a processor; and
a memory storing one or more instructions for execution by the processor, the one or more instructions including:
instructions for downloading the first audio file and the first text file matching the first audio file;
instructions for partly truncating the first audio file to obtain the first audio clip according to the first indication information for identifying the truncating start position and the second indication information for identifying the truncating end position;
instructions for playing the first audio clip and dynamically displaying the text information part in the first text file corresponding to the first audio clip synchronously;
instructions for acquiring the voice information of a user while playing the first audio chip; and
instructions for synthesizing the first audio clip and the voice information into the first acquisition result.

A computer storage medium is also provided, which stores a computer executable instruction, wherein the computer executable instruction is used for executing the information processing method.

An information processing method of the present disclosure which is applied to the terminal includes that: the first operation is triggered; in response to the first operation, the first audio file and the first text file matching the first audio file are downloaded; according to the first indication information for identifying the truncating start position and the second indication information for identifying the truncating end position, the first audio file is partly truncated to obtain the first audio clip; the second operation is triggered; in response to the second operation, the first audio clip is played, and the text information part in the first text file corresponding to the first audio clip is dynamically displayed synchronously; the voice information of user is acquired while playing the first audio chip; and the first audio clip and the voice information are synthesized into the first acquisition result.

By using the information processing method and client of the present disclosure, a part of content of the downloaded audio file can be truncated to play; on one hand, the amount of acquired information is reduced, and the processing load of the terminal is lightened; on the other hand, the user can truncate the audio content that he/she is interested in or he/she can do according to his/her own preference and voice.

DETAILED DESCRIPTION

The implementation of the technical solutions is described below in combination with the accompanying drawings in detail.

Figure 1:
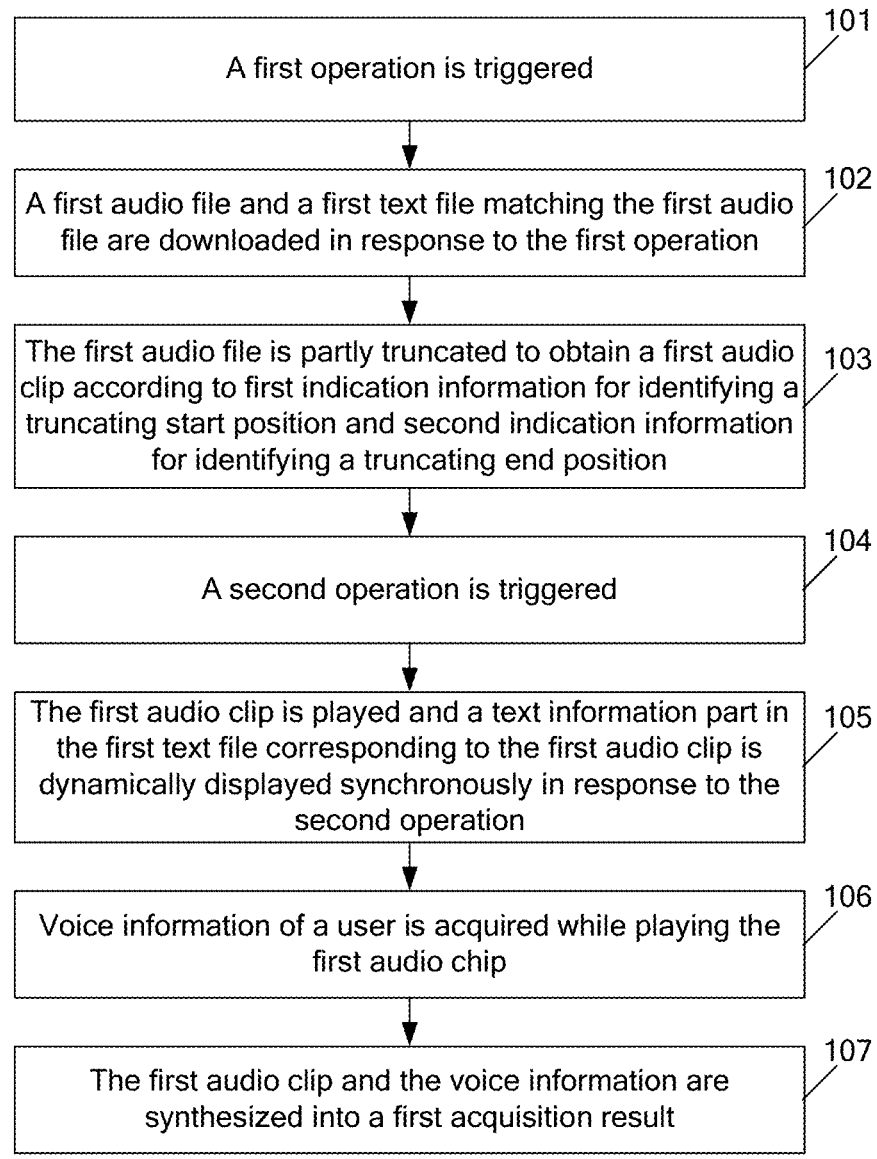
FIG. 1 is a flowchart of an embodiment 1 of a method in the present disclosure.

The present disclosure provides an information processing method which is applied to the terminal; as shown in FIG. 1, the method includes the following steps:

Step 101: a first operation is triggered;

Step 102: in response to the first operation, a first audio file and a first text file matching the first audio file are downloaded;

Step 103: according to first indication information for identifying a truncating start position and second indication information for identifying a truncating end position, the first audio file is partly truncated to obtain a first audio clip;

Step 104: a second operation is triggered;

Step 105: in response to the second operation, the first audio clip is played, and a text information part in the first text file corresponding to the first audio clip is dynamically displayed synchronously;

Step 106: voice information of user is acquired while playing the first audio chip; and Step 107: the first audio clip and the voice information are synthesized into a first acquisition result.

The steps in the above method can be performed in a different order or in the way of concurrency on condition of not conflicting. For example, the operation of downloading the first audio file in Step 102 can be completed before the operation of truncating in Step 103, and it is also possible to only download information necessary for the operation of truncating in Step 103, and then, when the first audio clip is played in Step 105, audio data needed later is played while being downloaded in the way of streaming media.

By using the method of the present embodiment, the technical problem in the traditional art that a part of content of the audio file cannot be truncated to play is solved. On one hand, from a device perspective, truncating a part of content of the audio file to play and acquiring the corresponding voice information will considerably reduce the amount of acquired information, and lighten the processing load of the terminal; on the other hand, from a user perspective, the user can truncate the audio content that he/she is interested in or he/she can do according to his/her own preference and voice, thereby improving the user experience.

Figure 2:
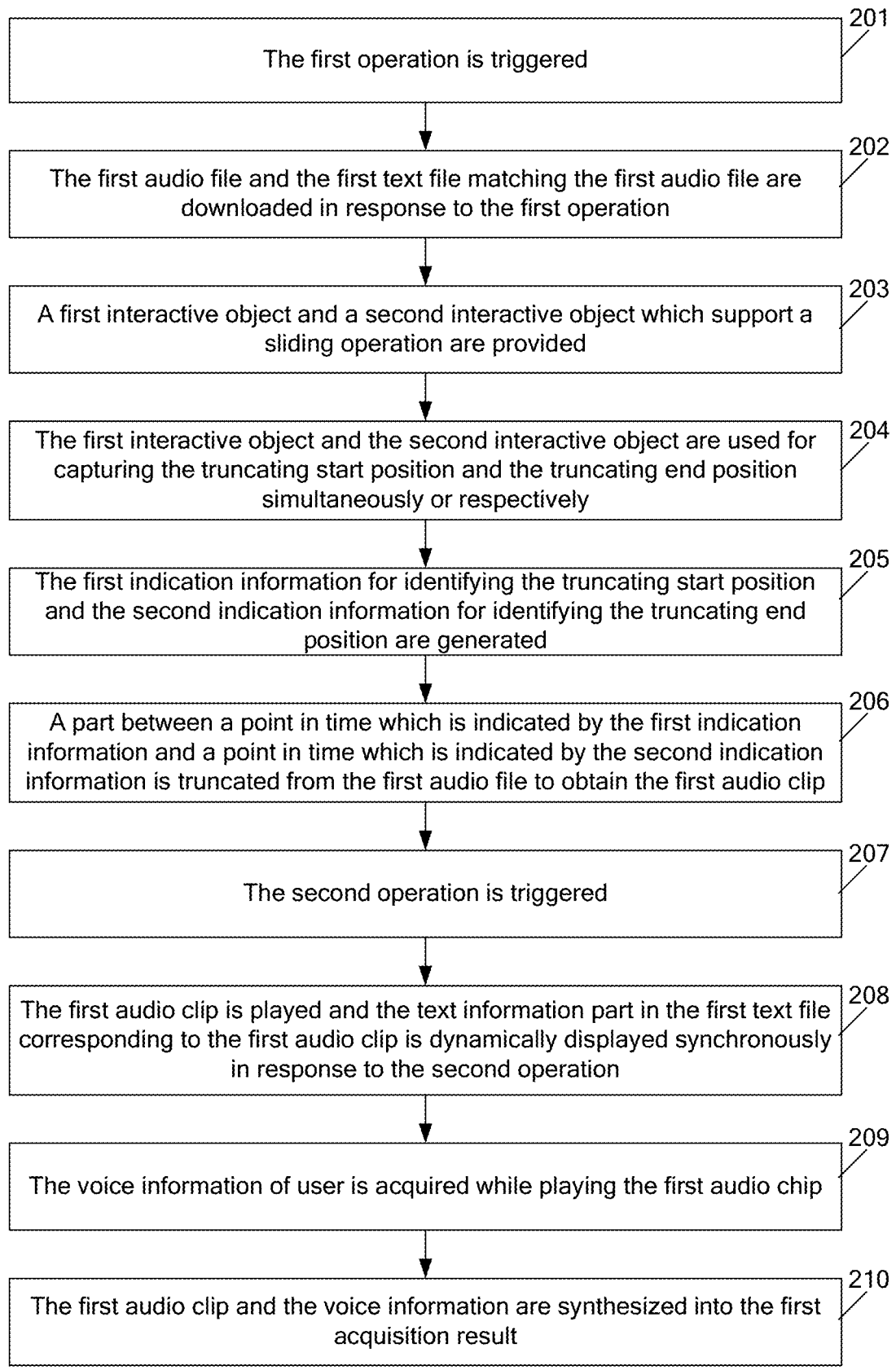
FIG. 2 is a flowchart of an embodiment 2 of the method in the present disclosure.

The present disclosure provides an information processing method which is applied to the terminal; as shown in FIG. 2, the method includes the following steps:

Step 201: the first operation is triggered;

Step 202: in response to the first operation, the first audio file and the first text file matching the first audio file are downloaded;

Step 203: a first interactive object and a second interactive object which support a sliding operation are provided;

Step 204: the first interactive object and the second interactive object are used for capturing the truncating start position and the truncating end position simultaneously or respectively;

Step 205: the first indication information for identifying the truncating start position and the second indication information for identifying the truncating end position are generated;

Step 206: a part between a point in time which is indicated by the first indication information and a point in time which is indicated by the second indication information is truncated from the first audio file to obtain the first audio clip;

Step 207: the second operation is triggered;

Step 208: in response to the second operation, the first audio clip is played, and the text information part in the first text file corresponding to the first audio clip is dynamically displayed synchronously;

Step 209: the voice information of user is acquired while playing the first audio chip; and Step 210: the first audio clip and the voice information are synthesized into the first acquisition result.

Compared with the embodiment 1 of the method, the present embodiment provides a specific implementation method for truncating a part of content of the audio file to play, in which two interactive objects which can be slid are provided for the user. For example, in a situation where the user uses a terminal with a touch screen, the user can control, through the sliding gestures of a finger on the touch screen, two interactive objects to determine the truncating start position and the truncating end position.

The user can use a single finger to control two interactive objects according to the need or according to his/her operating habit; for example, the user uses a touch operation of a single finger to control one of two interactive objects to determine the truncating start position, and then uses a single finger to control the other of the two interactive objects to determine the truncating end position after the truncating start position is determined; certainly, it is possible to use a touch operation of a single finger to control one of two interactive objects to determine the truncating end position, and then use the single finger to control the other of the two interactive objects to determine the truncating start position after the truncating end position is determined; anyhow, the purpose is respectively controlling any one of two interactive objects by a single finger, and the specific implementation is not limited.

Or, the user also uses two fingers to control two interactive objects simultaneously; for example, the user uses sliding operations of two fingers on the screen to control two interactive objects simultaneously, after a position is selected, the truncating start position and the truncating end position in the selected position are determined by a touch-hold operation and a releasing operation; anyhow, the purpose is controlling two interactive objects by two fingers, and the specific implementation is not limited.

The above specific implementation of using whether a single finger or two fingers is greatly convenient for the user to use.

When the solutions are superposed, the commonly used is that:

in an implementation of the present embodiment, after capturing the truncating start position and the truncating end position, the text information part corresponding to the first audio clip can be displayed by distinguishing it from other text information parts.

In an implementation of the present embodiment, a third operation can be triggered; in response to the third operation, the text information can be translated upward or downward, and the interactive objects can be translated upward or downward along with the text information.

In an implementation of the present embodiment, after the first audio clip and the voice information are synthesized into the first acquisition result, the first acquisition result can be replayed.

In an implementation of the present embodiment, after the first audio clip and the voice information are synthesized into the first acquisition result, a fourth operation can be triggered; in response to the fourth operation, the first acquisition result can be saved locally, or uploaded to a server, or sent to another terminal.

In an implementation of the present embodiment, after the first audio clip and the voice information are synthesized into the first acquisition result, a fifth operation can be triggered; in response to the fifth operation, Step 208 to Step 211 are performed again.

In an implementation of the present embodiment, after the first audio clip and the voice information are synthesized into the first acquisition result, a sixth operation can be triggered; in response to the sixth operation, a part of the first acquisition result can be truncated to obtain a second acquisition result.

In an implementation of the present embodiment, the first acquisition result can be superposed with other parts of the first audio file to obtain a third acquisition result.

In an implementation of the present embodiment, the first acquisition result can be analyzed to obtain an analysis result; the analysis result can be compared with the preset standard reference information to obtain a comparison result, and display the comparison result.

In an implementation of the present embodiment, the first acquisition result and the comparison result can be uploaded to the server together.

Figure 3:
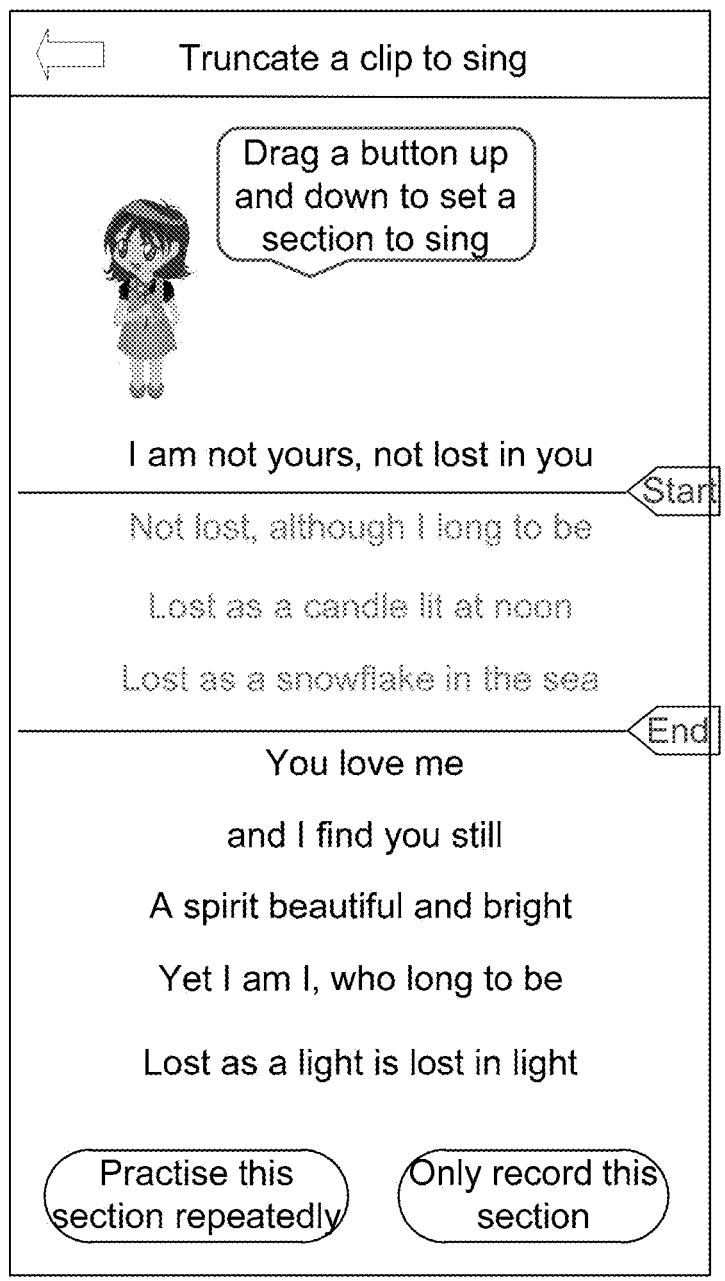
FIG. 3 is a schematic diagram of an application scenario applying the embodiment 2 of the method in the present disclosure.

In an application scenario of the present embodiment, the method described can be executed by a Karaoke APP. FIG. 3 is a schematic diagram of an application scenario of the present embodiment. Here, the first operation is an operation of selecting a song of the user, the first audio file is a melody with accompaniment corresponding to the song selected by the user, and the first text file a lyric file corresponding to the song selected by the user. The Karaoke APP can provide a recommendations list or a search interface for the user, so that the user can find the song to sing. After the user selecting a song, the terminal downloads from the server the corresponding melody with accompaniment and lyric file. The user can select to sing the whole song or truncate a clip; when a tab of "truncating a clip" is selected, the Karaoke APP displays on its interactive interface the lyrics of the whole song and two interactive objects. As shown in FIG. 3, in this application scenario, the two interactive objects appear as two labels "start" and "end", which support a sliding operation. The user determines, through a sliding gesture of the finger on the touch screen, the positions of the two labels to truncate the clip to sing, wherein a lyric part between the two labels "start" and "end" is highlighted by distinguishing from other lyric parts, for example, it is displayed by different colours or by enlarged fonts. The second operation is that the user clicks a button of "only record this clip"; when the user clicks the button, an audio output unit (e.g. a speaker or an earphone) of the terminal starts playing the truncated audio clip, and displays the lyrics corresponding to the audio clip on a display screen synchronously. The user sings referring to the melody with accompaniment and the lyrics, at the same time, the terminal collects the voice of user via a microphone. The terminal synthesizes the collected voice of user with the melody with accompaniment, thus the first acquisition result, namely an aria of the user, can be obtained after the user sings the clip.

Figure 4:
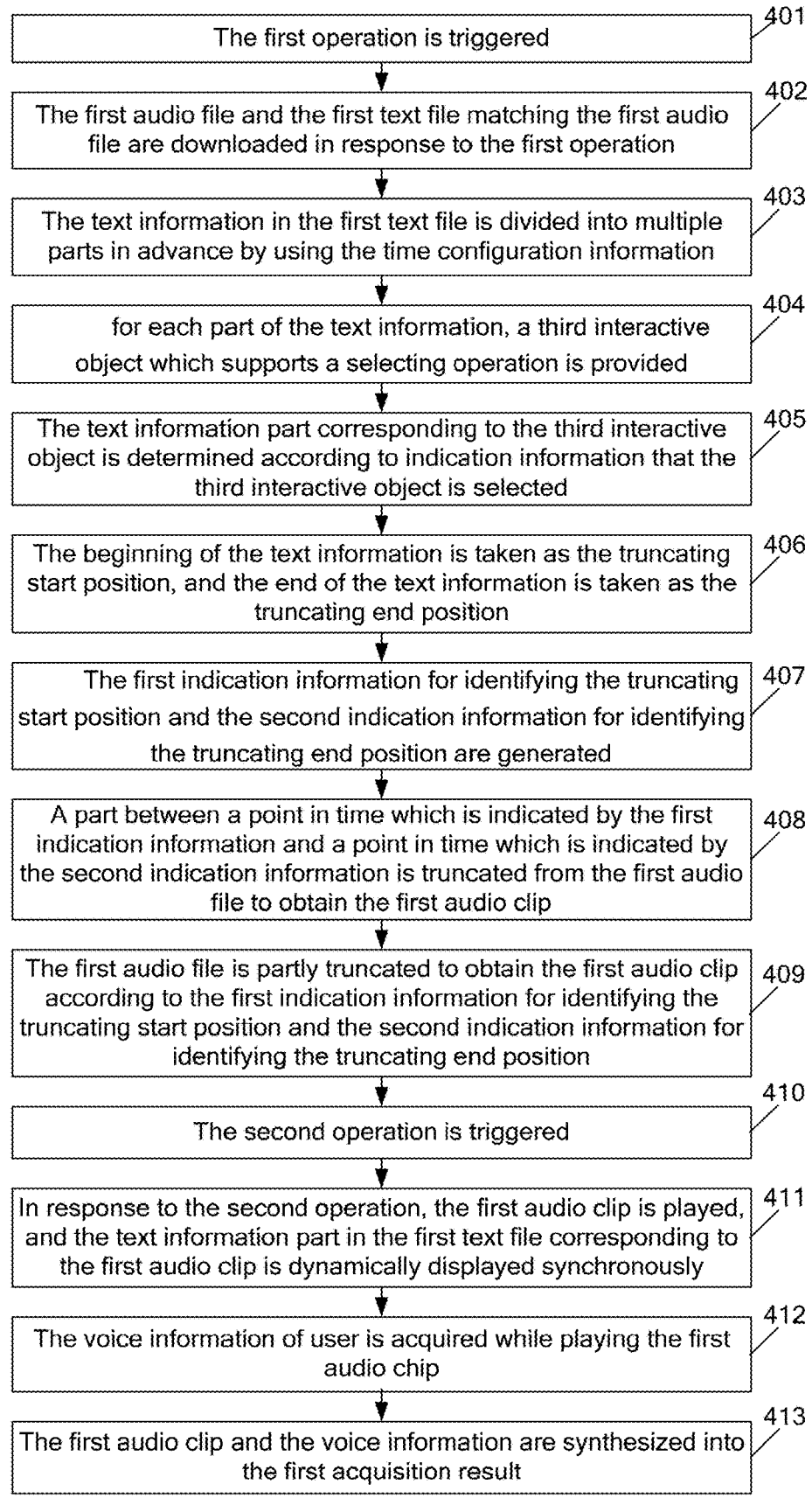
FIG. 4 is a flowchart of an embodiment 3 of the method in the present disclosure.

The present disclosure provides an information processing method which is applied to the terminal; as shown in FIG. 4, the method includes the following steps:

Step 401: the first operation is triggered;

Step 402: in response to the first operation, the first audio file and the first text file matching the first audio file are downloaded, wherein the first text file includes time configuration information and text information;

Step 403: the text information in the first text file is divided into multiple parts in advance by using the time configuration information;

Step 404: for each part of the text information, a third interactive object which supports a selecting operation is provided;

Step 405: the text information part corresponding to the third interactive object is determined according to indication information that the third interactive object is selected;

Step 406: the beginning of the text information is taken as the truncating start position, and the end of the text information is taken as the truncating end position;

Step 407: the first indication information for identifying the truncating start position and the second indication information for identifying the truncating end position are generated;

Step 408: a part between a point in time which is indicated by the first indication information and a point in time which is indicated by the second indication information is truncated from the first audio file to obtain the first audio clip;

Step 409: the first audio file is partly truncated to obtain the first audio clip according to the first indication information for identifying the truncating start position and the second indication information for identifying the truncating end position;

Step 410: the second operation is triggered;

Step 411: in response to the second operation, the first audio clip is played, and the text information part in the first text file corresponding to the first audio clip is dynamically displayed synchronously;

Step 412: the voice information of user is acquired while playing the first audio chip; and Step 413: the first audio clip and the voice information are synthesized into the first acquisition result.

Similar to the embodiment 2 of method, compared with the embodiment 1 of method, the method of the embodiment also provides a specific method for truncating a part of the content of the audio file to play. Compared with the embodiment 1 of method, in the present embodiment, the text information in the first text file is divided into multiple parts in advance, and for each part of the text information, an interactive object which supports the selecting operation is provided for the user. For example, the user can determine the truncating start position and the truncating end position by tapping on the touch screen through the finger or a touch pen or clicking the interactive object through a mouse. In this way, the user can complete the operation required to truncate the first audio clip by only one click, so the method of the present embodiment is more efficient compared with the embodiment 2 of method.

The superposed solution described in the embodiment 2 of method is also applied to the present embodiment, and it will not be repeated here.

Figure 5:
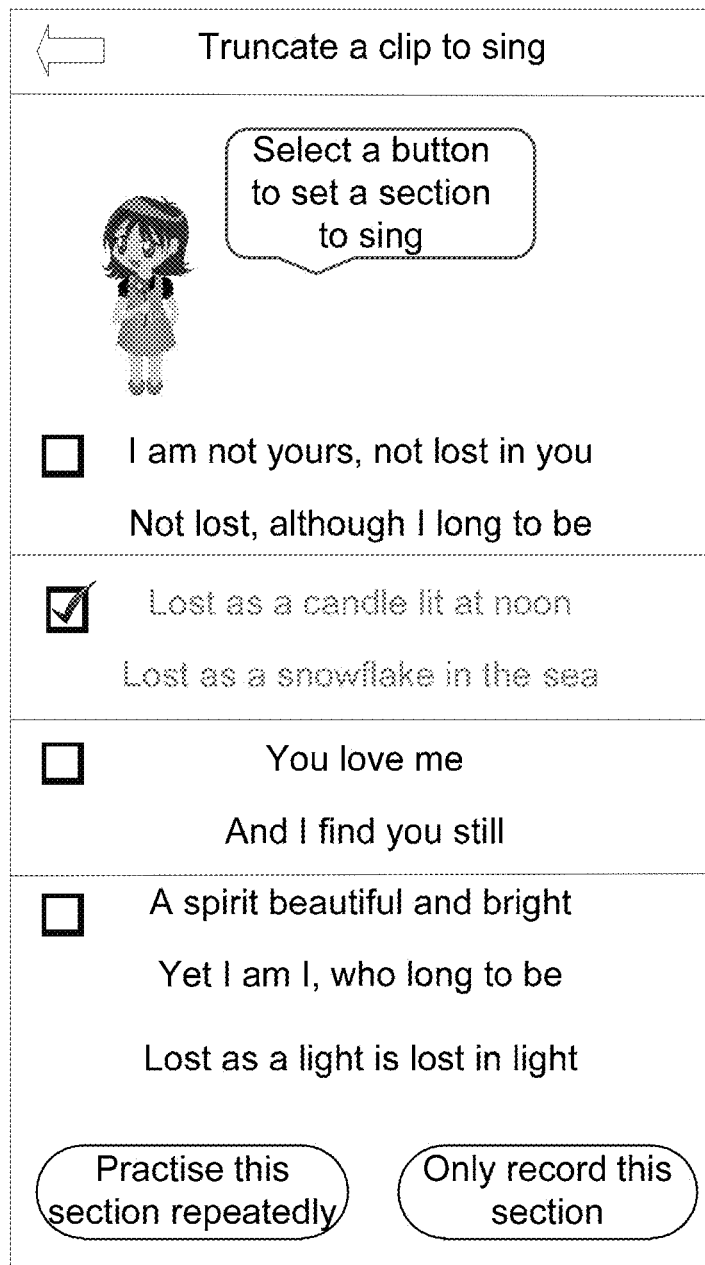
FIG. 5 is a schematic diagram of an application scenario applying the embodiment 3 of the method in the present disclosure.

In an application scenario of the present embodiment, the method described can also be executed by the Karaoke APP which is installed on the terminal. FIG. 5 is a schematic diagram of an application scenario of the present embodiment. As shown in FIG. 5, unlike the application scenario shown in FIG. 3, in this application scenario, the lyrics of the whole song are divided into multiple parts in advance, the interactive objects appear as multiple radio boxes which support the selecting operation, and each radio box corresponds to a lyric part. The user selects a radio box by tapping on the touch screen through the finger to determine the lyric part to be truncated, wherein the selected lyric part is highlighted by distinguishing from other lyric parts, for example, it is displayed by different colours or by enlarged fonts. Similarly, when the user clicks the button of "only record this clip", recording an audio file is started.

Figure 6:
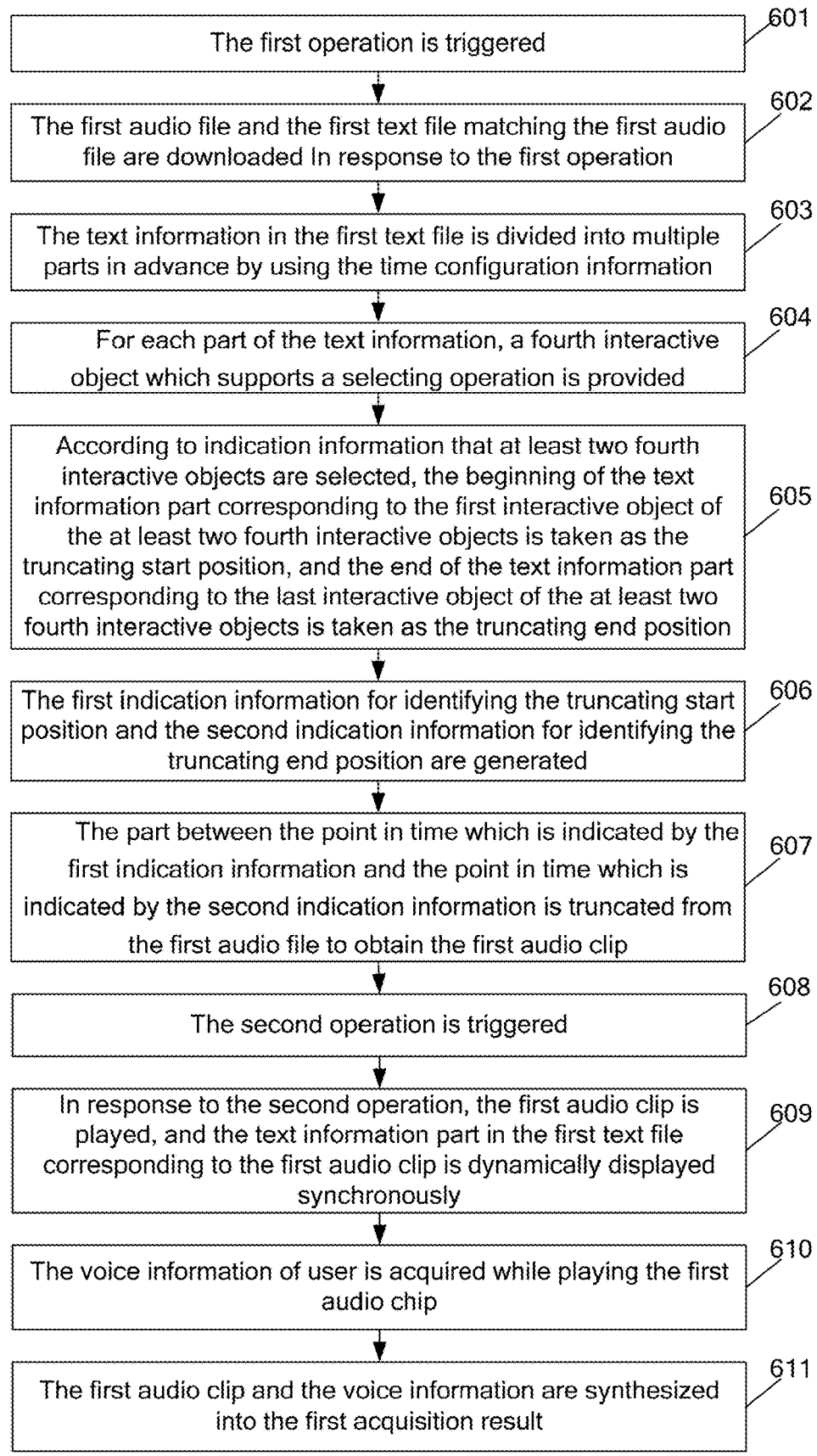
FIG. 6 is a flowchart of an embodiment 4 of the method in the present disclosure.

The present disclosure provides an information processing method which is applied to the terminal; as shown in FIG. 6, the method includes the following steps:

Step 601: the first operation is triggered;

Step 602: in response to the first operation, the first audio file and the first text file matching the first audio file are downloaded, wherein the first text file includes the time configuration information and the text information;

Step 603: the text information in the first text file is divided into multiple parts in advance by using the time configuration information;

Step 604: for each part of the text information, a fourth interactive object which supports a selecting operation is provided;

Step 605: according to indication information that at least two fourth interactive objects are selected, the beginning of the text information part corresponding to the first interactive object of the at least two fourth interactive objects is taken as the truncating start position, and the end of the text information part corresponding to the last interactive object of the at least two fourth interactive objects is taken as the truncating end position;

Step 606: the first indication information for identifying the truncating start position and the second indication information for identifying the truncating end position are generated;

Step 607: the part between the point in time which is indicated by the first indication information and the point in time which is indicated by the second indication information is truncated from the first audio file to obtain the first audio clip;

Step 608: the second operation is triggered;

Step 609: in response to the second operation, the first audio clip is played, and the text information part in the first text file corresponding to the first audio clip is dynamically displayed synchronously;

Step 610: the voice information of user is acquired while playing the first audio chip; and Step 611: the first audio clip and the voice information are synthesized into the first acquisition result.

Similar to the embodiment 2 of method and the embodiment 3 of method, compared with the embodiment 1 of method, the method of the embodiment also provides a specific method for truncating a part of the content of the audio file to play. Compared with the embodiment 3 of method, in the present embodiment, multiple interactive objects can be selected simultaneously. For example, the user can determine the truncating start position and the truncating end position according to the first selected interactive object and the last selected interactive object by tapping on the touch screen through the finger or the touch pen or clicking the interactive object through the mouse. In this way, the user can optionally truncate the audio clip by clicking twice according to his/her own needs, so the method of the present embodiment can achieve a more satisfactory truncating effect compared with the embodiment 3 of method.

The superposed solution described in the embodiment 2 of method is also applied to the present embodiment, and it will not be repeated here.

Figure 7:
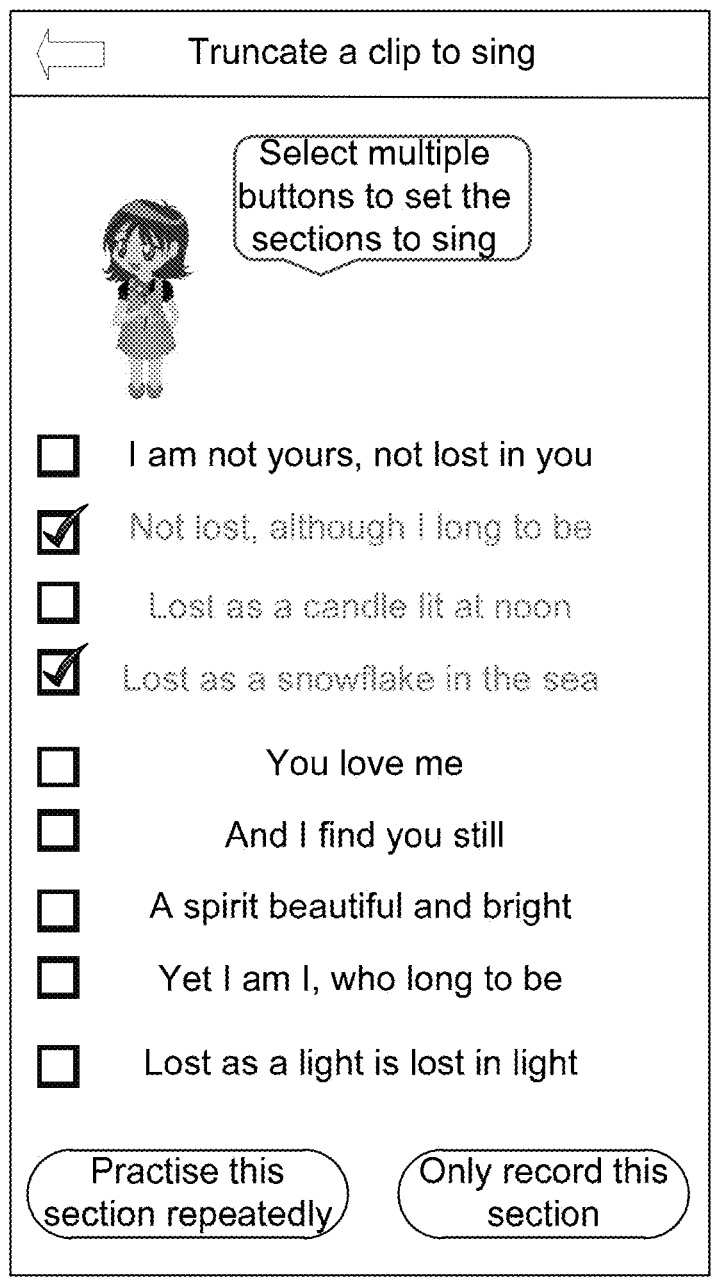
FIG. 7 is a schematic diagram of an application scenario applying the embodiment 4 of the method in the present disclosure.

In an application scenario of the present embodiment, the method described can also be executed by the Karaoke APP which is installed on the terminal. FIG. 7 is a schematic diagram of an application scenario of the present embodiment. As shown in FIG. 7, unlike the application scenario shown in FIG. 3, in this application scenario, the lyrics of the whole song are divided into multiple parts in advance, the interactive objects appear as multiple check boxes which support the selecting operation, and each radio box corresponds to a lyric. The user selects at least two check boxes by tapping on the touch screen through the finger, wherein the part between the first selected check box and the last selected check box is determined as the lyric part to be truncated, and the selected lyric part is highlighted by distinguishing from other lyric parts, for example, it is displayed by different colours or by enlarged fonts. Similarly, when the user clicks the button of "only record this clip", recording an audio file is started.

The embodiments of the present disclosure are elaborated below by taking a real application scenario for example.

Figure 8:
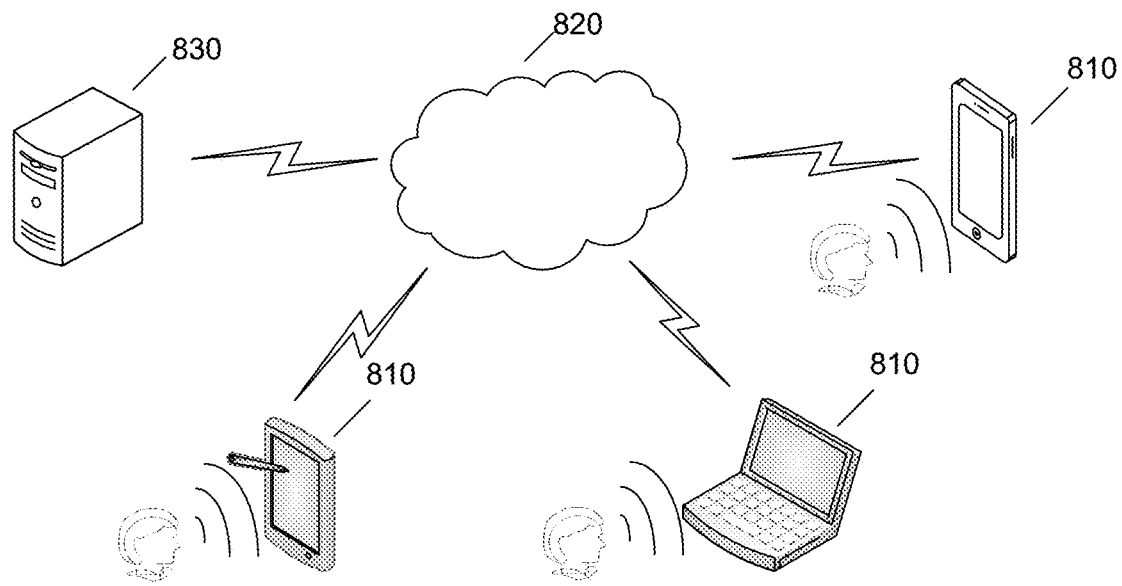
FIG. 8 is a structural diagram of a system for implementing an embodiment of the present disclosure.

FIG. 8 is a structural diagram of a system for implementing the embodiment of the present disclosure. FIG. 8 shows a system for singing Karaoke on the terminal. The system 800 includes one or more terminals 810, and one or more servers 830, wherein these terminals 810 and servers 830 are connected through a network 820. The Karaoke APP is installed in the terminal 810; the user uses the APP to download the melody with accompaniment and the corresponding lyrics from the server 830, truncates a clip from the melody with accompaniment, sings based on the clip of the melody with accompaniment played on the terminal and the lyrics displayed synchronously, uploads the aria and recorded by him/her and views comments of others on this aria, listens to and comments on the arias recorded by others, and so on.

Figure 9:
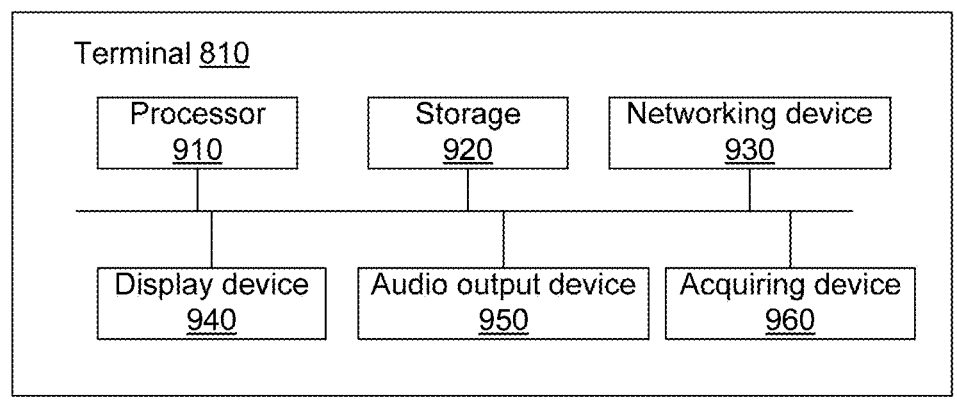
FIG. 9 is a structural diagram of a terminal for implementing an embodiment of the present disclosure.

The terminal 810 can be a smart phone, a WiFi earphone, a tablet computer, a notebook computer, and so on. FIG. 9 is a block diagram of the terminal 810 for implementing the embodiment of the present disclosure. The terminal 810 includes a processor 910, a storage 920, a networking device 930, a display device 940, an audio output device 950 (including the speaker, the earphone, etc.) and an acquiring device 960 (e.g. the microphone, the headset, etc.). The processor 910 is configured to execute the method of the present disclosure in combination with other components. The networking device 930 is configured to enable communications between the terminal 810 and the server 830, for example, obtaining from the server 830 a list of recommended melodies with accompaniment and a list of recommended arias, downloading the melody with accompaniment, the lyrics and the arias uploaded by others, and uploading the recorded aria to the server. The storage 920 is configured to store the audio file and the text file downloaded from the server, and the voice information and the acquisition result obtained by synthesizing which are acquired by the acquiring device 960. The audio output device 950 is configured to play the melody with accompaniment and the acquisition result. The display device 940 is configured to display the lyrics synchronously while playing the melody with accompaniment or the acquisition result. The acquiring device 960 is configured to acquire the voice information of user.

Figure 10:
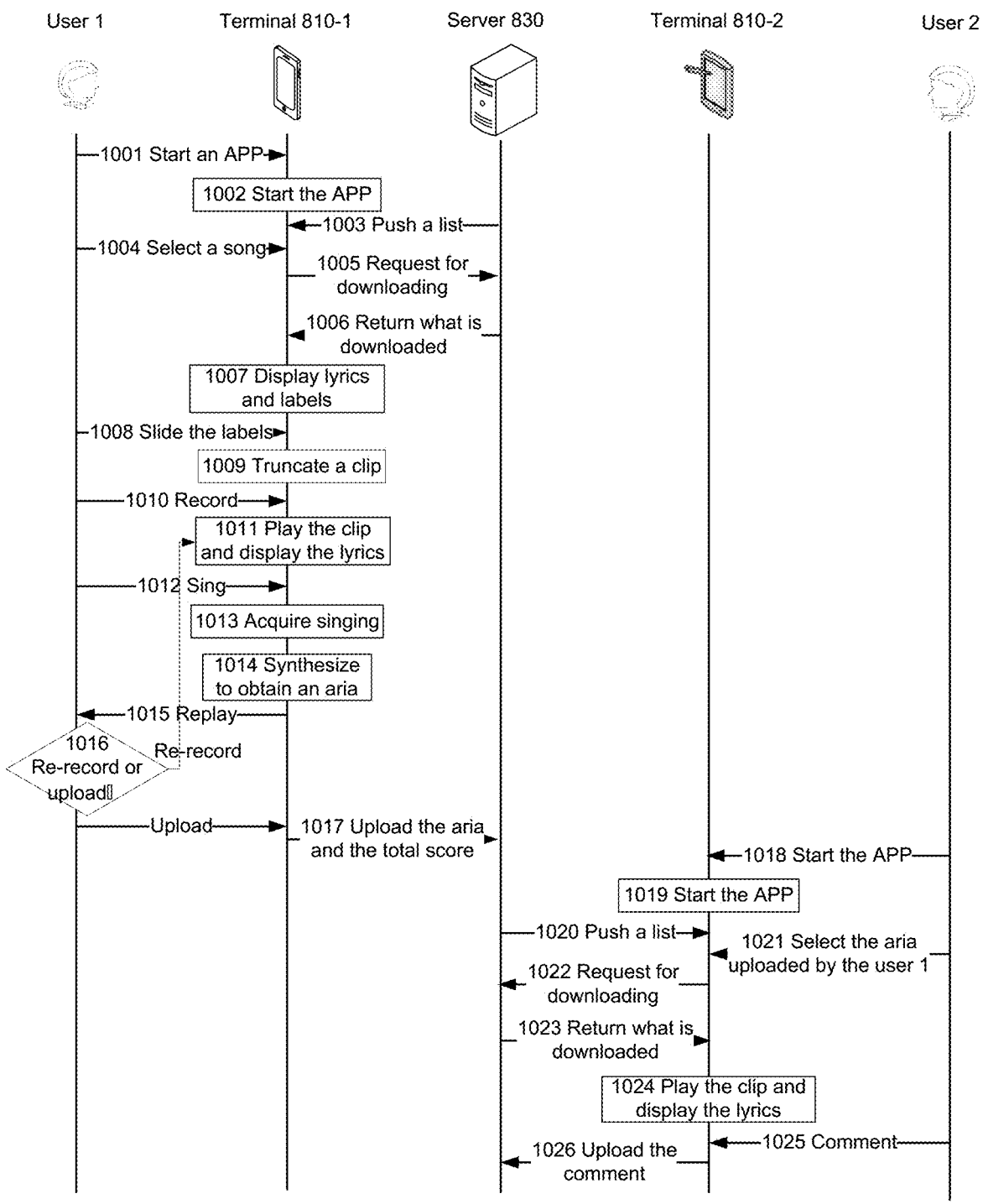
FIG. 10 is an interactive flowchart of implementing an embodiment of the present disclosure.

An interactive flow of implementing the present embodiment is described in combination with the embodiment 2 of the method. FIG. 10 is an interactive flowchart of implementing the embodiment of the present disclosure. The interactive flow involves a user 1, a terminal 810-1 used by the user 1, a user 2, a terminal 810-2 used by the user 2 and the server 830. For ease of description, functions implemented by the terminal 810-1 and the terminal 810-2 are differentiated. It should be understood that al these functions can be implemented on a terminal, and the whole Karaoke system is not limited to two terminals. The interactive flow includes the following steps:

Step 1001: the user 1 starts the APP by tapping on the touch screen of the terminal 810-1;

Step 1002: the terminal 810-1 starts the APP;

Step 1003: the server 830 pushes the list of recommended melodies with accompaniment and the list of recommended arias to the terminal 810-1;

Step 1004: the user 1 selects a song by tapping on the touch screen of the terminal 810-1;

Step 1005: the terminal 810-1 sends to the server a request for downloading the melody with accompaniment and the lyric file corresponding to the selected song;

Step 1006: the server 830 returns the melody with accompaniment and the corresponding lyric file;

Step 1007: the terminal 810-1 displays the lyrics, and a start label and an end label which can be operated by the user;

Step 1008: the user 1 slides the start label and the end label to determine a start and an end;

Step 1009: the terminal 810-1 truncates an audio clip between the start and the end from the melody with accompaniment;

Step 1010: the user 1 clicks a record button to send a command of starting recording to the terminal 810-1;

Step 1011: the terminal 810-1 plays the audio clip, and dynamically displays the lyrics corresponding to the audio clip;

Step 1012: the user 1 sings;

Step 1013: the terminal 810-1 acquires singing of the user 1, marks each singing performance of the user 1 in real time, and displays a score of the single singing performance on the display screen in real time;

Step 1014: the terminal 810-1 synthesizes the singing of the user 1 with the audio clip to obtain the aria of the user 1, works out the total score of the aria according to the real-time scores, and displays the total score on the display screen;

Step 1015: the terminal 810-1 replays the aria of the user 1 for the user 1 to listen, and provides options like re-recording and uploading for the user 1 to select;

Step 1016: if the user 1 selects the option of re-recording, then the interactive flow goes to Step 1011; if the user selects the option of uploading, then proceed to the next step;

Step 1017: the terminal 810-1 uploads the aria of the user 1 together with the total score to the server 830;

Step 1018: the user 2 starts the APP by tapping on the touch screen of the terminal 810-2;

Step 1019: the terminal 810-2 starts the APP;

Step 1020: the server 830 pushes the list of recommended melodies with accompaniment and the list of recommended arias to the terminal 810-2;

Step 1021: the user 2 selects the aria and uploaded by the user 1 by tapping on the touch screen of the terminal 810-2;

Step 1022: the terminal 810-2 sends a request for downloading the aria to the server 830;

Step 1023: the server 830 returns the aria and the corresponding lyrics;

Step 1024: the terminal 810-2 plays the aria, and dynamically displays the corresponding lyrics synchronously;

Step 1025: the user 2 listens to the aria and comments on it; and

Step 1026: the terminal 810-2 uploads the comment of the user 2 to the server 830.

Note that, the interactive flow described above is only an example, and the steps of marking in real time, working out the total score, uploading and commenting are selectable; the operation of truncating the audio clip can also be implemented in other ways, for example, it is implemented by the ways in the embodiment 3 of method or the embodiment 4 of method; the way of selecting the melody with accompaniment and the aria from the list of recommended melodies with accompaniment and the list of recommended arias which is mentioned in the above description is only an example, the user can select the melody with accompaniment and the aria that he/she is interested in by other means, for example, keyword search.

Based on the above embodiments of method, the present disclosure provides embodiments of client. The following description about the embodiments of client is similar to the description about the method; like the description about the beneficial effects of the method, the description about the embodiments of client is not repeated. With respect to the technical details which are not disclosed in the embodiments of client of the present disclosure, the description about the embodiments of method of the present disclosure can serve as a reference.

Figure 11:
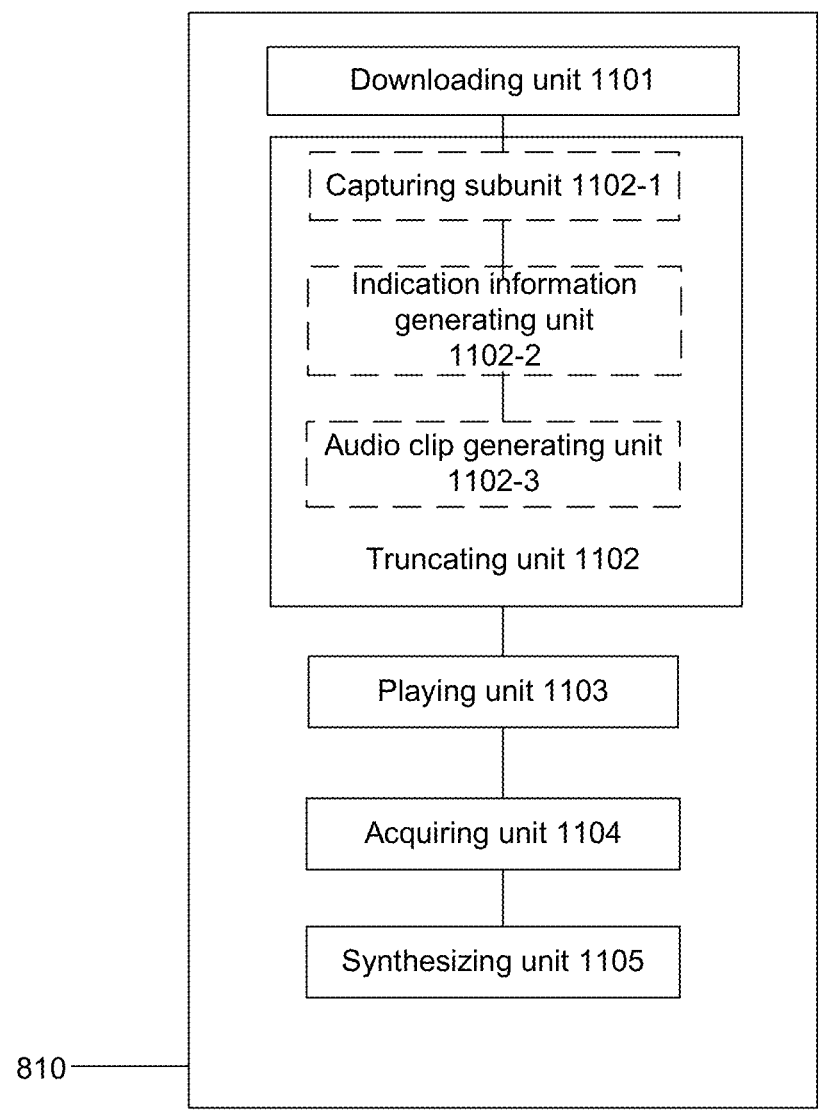
FIG. 11 is a structural diagram of an embodiment 1 of a client in the present disclosure.

The present disclosure provides a client which is applied to the terminal; as shown in FIG. 11, the client 810 includes:

a downloading unit 1101, which is configured to download the first audio file and the first text file matching the first audio file;

a truncating unit 1102, which is configured to, according to the first indication information for identifying the truncating start position and the second indication information for identifying the truncating end position, partly truncate the first audio file to obtain the first audio clip;

a playing unit 1103, which is configured to play the first audio clip, and dynamically display the text information part in the first text file corresponding to the first audio clip synchronously;

an acquiring unit 1104, which is configured to acquire the voice information of user while playing the first audio chip; and a synthesizing unit 1105, which is configured to synthesize the first audio chip and the voice information into the first acquisition result.

In a specific implementation of the present embodiment, optionally, the truncating unit 1102 includes:

a capturing subunit 1102-1, which is configured to capture the truncating start position and the truncating end position;

an indication information generating unit 1102-2, which is configured to generate the first indication information for identifying the truncating start position and the second indication information for identifying the truncating end position; and an audio clip generating unit 1102-3, which is configured to truncate, from the first audio file, a part between the point in time which is indicated by the first indication information and the point in time which is indicated by the second indication information to obtain the first audio clip.

In a specific implementation of the present embodiment, optionally, the capturing subunit 1102-1 is configured to provide the first interactive object and the second interactive object which support the sliding operation, and use the first interactive object and the second interactive object to capture the truncating start position and the truncating end position simultaneously or respectively.

Figure 12:
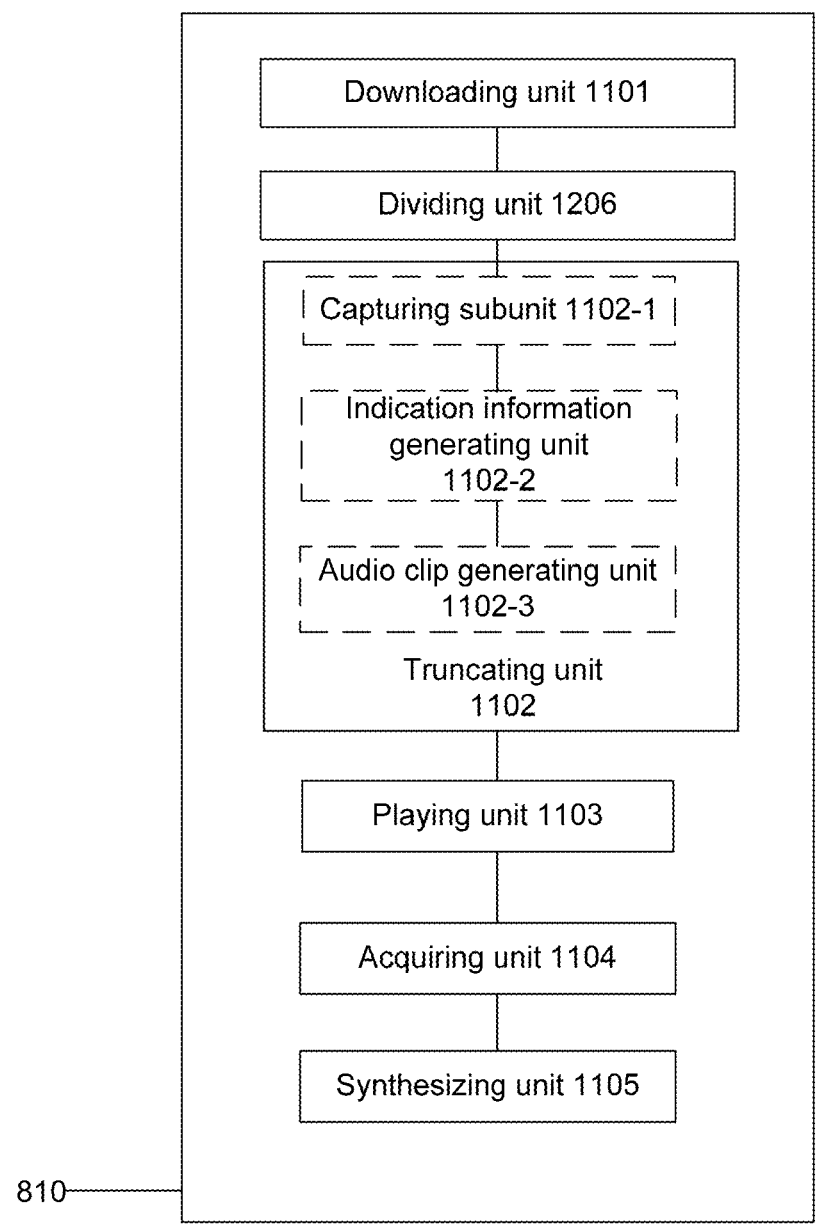
FIG. 12 is a structural diagram of an embodiment 2 of the client in the present disclosure.

The present disclosure provides a client 810 which is applied to the terminal; except the downloading unit 1101, the truncating unit 1102, the playing unit 1103, the acquiring unit 1104 and the synthesizing unit 1105 which are shown in FIG. 11, as shown in FIG. 12, the client also includes: a dividing unit 1206, which is configured to use the time configuration information of the first text file to divide the text information in the first text file into multiple parts in advance.

In a specific implementation of the present embodiment, the capturing subunit 1102-1 is configured to provide a third interactive object which supports the selecting operation for each part of the text information, determine the text information part corresponding to the third interactive object according to the indication information that a third interactive object is selected, take the beginning of the text information part as the truncating start position, and take the end of the text information part as the truncating end position.

In another specific implementation of the present embodiment, the capturing subunit 1102-1 is configured to provide a fourth interactive object which supports the selecting operation for each part of the text information, according to the indication information that at least two fourth interactive objects are selected, determine the beginning of the text information part corresponding to the first interactive object of the at least two fourth interactive objects as the truncating start position, and determine the end of the text information part corresponding to the last interactive object of the at least two fourth interactive objects as the truncating end position.

In a specific implementation of the present embodiment, optionally, the client further includes: a marking by distinguishing unit, which is configured to, after capturing the truncating start position and the truncating end position, display the text information part corresponding to the first audio clip by distinguishing it from other text information parts.

In a specific implementation of the present embodiment, optionally, the client further includes: a translating unit, which is configured to translate the text information upward or downward, and translate the interactive objects upward or downward along with the text information.

In a specific implementation of the present embodiment, optionally, the client further includes: a replaying unit, which is configured to, after synthesizing the first audio clip and the voice information into the first acquisition result, replay the first acquisition result.

In a specific implementation of the present embodiment, optionally, the client further includes: a saving unit, which is configured to save the first acquisition result locally; and an uploading unit, which is configured to upload the first acquisition result to the server.

In a specific implementation of the present embodiment, optionally, the client further includes: an analyzing unit, which is configured to analyze the first acquisition result; and a comparing unit, which is configured to compare the analysis result with the preset standard reference information to obtain a comparison result, and display the comparison result.

When the integrated modules of the present disclosure are implemented in the form of software function modules and sold or used as independent products, they can also be stored in a computer readable storage medium. Based on this understanding, those skilled in the art should appreciate that the embodiments of the application can be provided as a method, a system or a computer program product. So, this application can adopt the forms of full hardware embodiment, full software embodiment, or embodiment combining software and hardware. Besides, this application can adopt the form of a computer program product which is implemented on one or more computer available storage media including computer available program codes, wherein the storage media include, but are not limited to, a USB flash disk, a mobile hard disk drive, a Read-Only Memory (ROM), a magnetic disk memory, a Compact Disc-ROM (CD-ROM), an optical memory, and so on.

This application is described according to the flowcharts and/or block diagrams of the method, the device (system) and the computer program product in the embodiments of this application. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the device which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction device, wherein the instruction device implements the specified functions in one or more flows of the flowchart and/or one or more blocks of the block diagram.

These computer program instructions can also be loaded on the computer or other programmable data processing equipment, so that a series of operation steps are performed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

Although the preferred embodiments of this application have been described, once learning the basic creative concept, those skilled in the art can make other changes and modifications to these embodiments. So, the claims are intended to include the preferred embodiments and all the changes and modifications in the scope of this application.

Correspondingly, the present disclosure also provides a computer storage medium which stores a computer executable instruction, wherein the computer executable instruction is used for executing the above information processing method.

INDUSTRIAL APPLICABILITY

By using the information processing method and client of the present disclosure, a part of content of the downloaded audio file can be truncated to play; on one hand, the amount of acquired information is reduced, and the processing load of the terminal is lightened; on the other hand, the user can truncate the audio content that he/she is interested in or he/she can do according to his/her own preference and voice.

What is claimed is:

1. A method for processing information, which is applied to a terminal, comprising:
   triggering a first operation;
   sending, by the terminal, to a server a request for downloading a first audio file and a first text file matching the first audio file, in response to the first operation;
   downloading, by the terminal from the server, the first audio file and the first text file matching the first audio file;
   displaying, by the terminal, the first audio file and the first text file matching the first audio file;
   capturing, by the terminal, a truncating start position and a truncating end position;
   generating, by the terminal, first indication information for identifying the truncating start position and second indication information for identifying the truncating end position; and
   truncating, by the terminal from the first audio file, a part between a point in time which is indicated by the first indication information and a point in time which is indicated by the second indication information to obtain a first audio clip;
   triggering a second operation;
   playing, by the terminal, the first audio clip and dynamically displaying a text information part in the first text file corresponding to the first audio clip synchronously in response to the second operation;
   acquiring, by the terminal, voice information of a user while playing the first audio chip; and
   synthesizing, by the terminal, the first audio clip and the voice information into a first acquisition result;
   triggering a fourth operation; and
   saving, by the terminal, the first acquisition result locally, and uploading the first acquisition result to the server or sending the first acquisition result to another terminal.

2. The method according to claim 1, wherein the step of capturing, by the terminal, the truncating start position and the truncating end position comprises:
   providing a first interactive object and a second interactive object which support a sliding operation; and
   using the first interactive object and the second interactive object to capture the truncating start position and the truncating end position simultaneously or respectively.

3. The method according to claim 2, further comprising: after capturing the truncating start position and the truncating end position, displaying the text information part corresponding to the first audio clip by distinguishing it from other text information parts.

4. The method according to claim 2, further comprising:
   triggering a third operation;
   in response to the third operation, translating the text information upward or downward, and translating the interactive objects upward or downward along with the text information.

5. The method according to claim 1, wherein the first text file comprises time configuration information and text information, and the method further comprises:
   using the time configuration information to divide the text information in the first text file into multiple parts in advance;
   capturing, by the terminal, the truncating start position and the truncating end position comprises:
   for each part of the text information, providing a third interactive object which supports a selecting operation;
   determining the text information part corresponding to the third interactive object according to indication information that the third interactive object is selected; and
   taking the beginning of the text information as the truncating start position, and taking the end of the text information as the truncating end position.

6. The method according to claim 1, wherein the first text file comprises the time configuration information and the text information, and the method further comprises:
   using the time configuration information to divide the text information in the first text file into multiple parts in advance;
   capturing, by the terminal, the truncating start position and the truncating end position comprises:
   for each part of the text information, providing a fourth interactive object which supports a selecting operation;
   according to indication information that at least two fourth interactive objects are selected, taking the beginning of the text information part corresponding to the first interactive object of the at least two fourth interactive objects as the truncating start position, and taking the end of the text information part corresponding to the last interactive object of the at least two fourth interactive objects as the truncating end position.

7. The method according to claim 1, further comprising:
   after synthesizing the first audio clip and the voice information into the first acquisition result, replaying the first acquisition result.

8. The method according to claim 1, further comprising:
   analyzing the first acquisition result to obtain an analysis result; and
   comparing the analysis result with preset standard reference information to obtain a comparison result, and displaying the comparison result.

9. A client, comprising:
   a processor; and
   a memory storing one or more instructions for execution by the processor, the one or more instructions including:
   instructions for sending to a server a request for downloading a first audio file and a first text file matching the first audio file;
   instructions for downloading the first audio file and the first text file matching the first audio file from the server;
   instructions for displaying the first audio file and the first text file matching the first audio file;
   instructions for capturing a truncating start position and a truncating end position;

instructions for generating first indication information for identifying the truncating start position and second indication information for identifying the truncating end position;

instructions for truncating, from the first audio file, a part between a point in time which is indicated by the first indication information and a point in time which is indicated by the second indication information to obtain a first audio clip;

instructions for playing the first audio clip and dynamically displaying a text information part in the first text file corresponding to the first audio clip synchronously;

instructions for acquiring voice information of a user while playing the first audio chip;

instructions for synthesizing the first audio clip and the voice information into a first acquisition result;

instructions for saving the first acquisition result locally; and instructions for uploading the first acquisition result to the server or sending the first acquisition result to another terminal.

10. The client according to claim 9, wherein the instructions for capturing the truncating start position and the truncating end position comprise: instructions for providing a first interactive object and a second interactive object which support a sliding operation, and instructions for using the first interactive object and the second interactive object to capture the truncating start position and the truncating end position simultaneously or respectively.

11. The client according to claim 10, wherein the one or more instructions further comprise: instructions for displaying the text information part corresponding to the first audio clip by distinguishing it from other text information parts.

12. The client according to claim 10, wherein the one or more instructions further comprise:
instructions for translating the text information upward or downward and translating the interactive objects upward or downward along with the text information.

13. The client according to claim 9, wherein the first text file comprises time configuration information and text information, and the one or more instructions further comprise: instructions for using the time configuration information to divide the text information in the first text file into multiple parts in advance;
the instructions for capturing the truncating start position and the truncating end position comprise:
instructions for providing, for each part of the text information, a third interactive object which supports a selecting operation;
instructions for determining the text information part corresponding to the third interactive object according to indication information that the third interactive object is selected; and
instructions for taking the beginning of the text information as the truncating start position and taking the end of the text information as the truncating end position.

14. The client according to claim 9, wherein the first text file comprises the time configuration information and the text information, and the one or more instructions further comprise: instructions for using the time configuration information to divide the text information in the first text file into multiple parts in advance;
the instructions for capturing the truncating start position and the truncating end position comprise:
instructions for providing, for each part of the text information, a fourth interactive object which supports a selecting operation;

instructions for, according to indication information that at least two fourth interactive objects are selected, taking the beginning of the text information part corresponding to the first interactive object of the at least two fourth interactive objects as the truncating start position and taking the end of the text information part corresponding to the last interactive object of the at least two fourth interactive objects as the truncating end position.

15. The client according to claim 9, wherein the one or more instructions further comprise:
instructions for replaying the first acquisition result.

16. The client according to claim 9, wherein the one or more instructions further comprise:
instructions for analyzing the first acquisition result to obtain an analysis result;
instructions for comparing the analysis result with preset standard reference information to obtain a comparison result and displaying the comparison result.

17. A non-transitory computer storage medium having computer executable instructions stored thereon, the computer executable instructions executable by one or more processors of a terminal for:
triggering a first operation;
sending, by the terminal, to a server a request for downloading a first audio file and a first text file matching the first audio file, in response to the first operation;
downloading, by the terminal from a server, the first audio file and the first text file matching the first audio file;
displaying, by the terminal, the first audio file and the first text file matching the first audio file;
capturing, by the terminal, a truncating start position and a truncating end position;
generating, by the terminal, first indication information for identifying the truncating start position and second indication information for identifying the truncating end position; and
truncating, by the terminal from the first audio file, a part between a point in time which is indicated by the first indication information and a point in time which is indicated by the second indication information to obtain a first audio clip;
triggering a second operation;
playing, by the terminal, the first audio clip and dynamically displaying a text information part in the first text file corresponding to the first audio clip synchronously in response to the second operation;
acquiring, by the terminal, voice information of a user while playing the first audio chip; and
synthesizing, by the terminal, the first audio clip and the voice information into a first acquisition result;
triggering a fourth operation; and
saving, by the terminal, the first acquisition result locally, and uploading the first acquisition result to the server or sending the first acquisition result to another terminal.

18. The non-transitory computer storage medium according to claim 17, wherein capturing, by the terminal, the truncating start position and the truncating end position comprises:
providing a first interactive object and a second interactive object which support a sliding operation; and
using the first interactive object and the second interactive object to capture the truncating start position and the truncating end position simultaneously or respectively.

19. The non-transitory computer storage medium according to claim 17, wherein the first text file comprises time configuration information and text information, and the computer executable instructions executable by one or more processors of the terminal for:

using the time configuration information to divide the text information in the first text file into multiple parts in advance;

capturing, by the terminal, the truncating start position and the truncating end position comprises:

for each part of the text information, providing a third interactive object which supports a selecting operation;

determining the text information part corresponding to the third interactive object according to indication information that the third interactive object is selected; and taking the beginning of the text information as the truncating start position, and taking the end of the text information as the truncating end position.

20. The non-transitory computer storage medium according to claim 17, wherein the first text file comprises the time configuration information and the text information, and the computer executable instructions executable by one or more processors of a terminal for:

using the time configuration information to divide the text information in the first text file into multiple parts in advance;

capturing, by the terminal, the truncating start position and the truncating end position comprises:

for each part of the text information, providing a fourth interactive object which supports a selecting operation;

according to indication information that at least two fourth interactive objects are selected, taking the beginning of the text information part corresponding to the first interactive object of the at least two fourth interactive objects as the truncating start position, and taking the end of the text information part corresponding to the last interactive object of the at least two fourth interactive objects as the truncating end position.

\* \* \* \* \*